United States Patent [19]
Felger

[11] 3,901,216
[45] Aug. 26, 1975

[54] METHOD FOR MEASURING ENDODONTIC WORKING LENGTHS

[76] Inventor: Milton R. Felger, 892 Chestnut Tree Dr., Rt. 9, Annapolis, Md. 21401

[22] Filed: Dec. 20, 1973

[21] Appl. No.: 426,476

[52] U.S. Cl. ............ 128/2.1 Z; 32/40 R; 324/61 QL
[51] Int. Cl.[2] .......................................... A61B 5/05
[58] Field of Search .............. 128/2 S, 2.1 Z, 2.1 R, 128/2 R, 2 N; 32/40 R; 324/61 R, 61 P, 61 QL

[56] References Cited
UNITED STATES PATENTS

| | | | |
|---|---|---|---|
| 2,603,753 | 7/1952 | Axelson et al. | 128/2.1 R |
| 3,085,566 | 4/1963 | Tolles | 128/2.1 Z |
| 3,149,627 | 9/1964 | Bagno | 128/2.1 Z |
| 3,207,151 | 9/1965 | Takagi | 128/2.1 R |
| 3,213,360 | 10/1965 | Cook et al. | 324/61 R |
| 3,452,743 | 7/1969 | Ricke | 128/2.1 Z |
| 3,608,543 | 9/1971 | Longini | 128/2.1 Z |
| 3,660,901 | 5/1972 | Inoue | 128/2 S |
| 3,753,434 | 8/1973 | Pike et al. | 128/2.1 Z |
| 3,815,021 | 6/1974 | Kerr | 324/61 R |

Primary Examiner—Richard A. Gaudet
Assistant Examiner—Lee S. Cohen
Attorney, Agent, or Firm—Arthur Schwartz

[57] ABSTRACT

A method for measuring the depth of a root canal in a tooth including: (1) forming an opening in the tooth crown, (2) placing a disc-shaped electrode on mucosa adjacent the submerged tooth root, (3) inserting a probe electrode in the form of an endodontic file through the opening into the root canal, (4) measuring the capacitance across the electrodes, (5) continuing to further insert the probe electrode until the capacitance substantially increases, and (6) measuring the depth of penetration at the point the capacitance substantially increases to locate the apical foramen.

The device for carrying out the method includes an oscillator set at 10 KHz and a capacitance bridge circuit connected to the oscillator. The electrodes form one arm of the bridge circuit, and a known capacitance of about 0.08 µf forms another arm thereof. The output of the bridge circuit is fed into a null detector so that an increase appearing on a null meter is seen when the probe electrode reaches the apical foramen.

5 Claims, 1 Drawing Figure

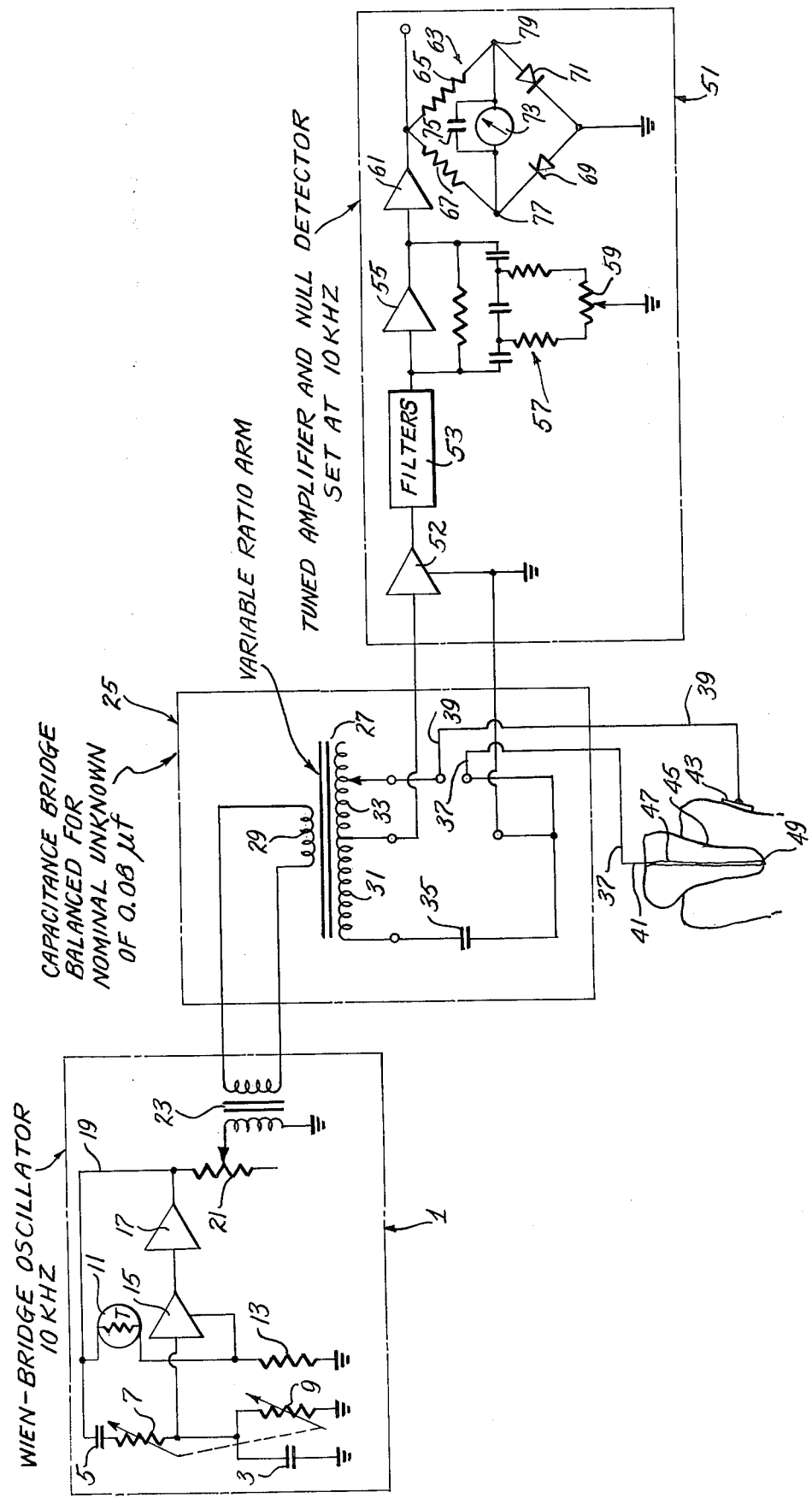

METHOD FOR MEASURING ENDODONTIC WORKING LENGTHS

BACKGROUND OF THE INVENTION

The instant invention relates to the bio-electronic measurement of the length of cavities, more particularly the endodontic working length.

Locating the apical foramen is essential for determination of the endodontic working length. This length must be known if instrumentation is to be properly controlled during biomechanical preparation and filling of the root canal. It is often difficult, if not impossible, to accurately locate the foramen by present roentgenographic methods, because of numerous technical problems and inherent deficiencies of roentgenography.

Inherent roentgenorgraphic errors stem from the faulty assumption that the anatomical apex and anatomical apical foramen are coincidental. The error is further magnified when the roentgenographic image of the apex is interpreted as the anatomical foramen in the calculation of root canal length. This error can be considerable when the curvature of the apical one-third of the root is perpendicular to the X-ray film and parallel to the roentgen rays.

D. L. Tagge and N. T. Crowell, in an article entitled "The Effect of Angulation and Object-Film Distance on the Radiographic Image," an unpublished report, Bethesda, Md., Naval Dental School, NNMC, July 1971, stated that it is clinically difficult to produce dental roentgenograms free from dimensional distortion. They confirmed that variation of such factors as object-film distance, and object or film angulation, can result in a lineal image distortion. Other deficiencies that contribute to error in reading dental X-ray studies are indistinct apical outlines and overlapping of roentgenopaque structures.

Technical difficulties in obtaining quality X-ray studies include faulty exposure and processing, contamination of the sterile filed, and lengthy procedure time. The high expense of equipment and supplies, and radiation hazards, are additional problems encountered with the roentgenographic method.

A more precise, reliable, and rapid means of ascertaining root canal lengths has been needed to replace the roentgenographic method presently used in clinical endodontics. An entirely new method of measuring root canal lengths by applying the principles of bio-electronics was first reported by I. Sunada in the Journal of Dental Research, Volume 41, pages 375–387, 1962. He determined that electrical tissue resistance between the oral mucosa and the apices of teeth was constant at approximately 6.5 kilohms. This principle was utilized by Pike et al. in U.S. Pat. No. 3,753,434. However, further evaluation of Sunada's method by S. Bocskay et al, in Volume 15, pages 27–32 of Stomatologia (Burcur), 1968, showed variations in impedance value between the oral mucosa and the tip of an electrode positioned at the roentgenographic apex.

In another study, N. Inoue reported in the Dental Survey, Volume 38, pages 38–39, 1972 and illustrated in U.S. Pat. No. 3,660,901 a constant, low-frequency oscillation when the tip of a needle electrode was placed at the roentgenographic apex. When the predetermined degree of oscillation sound comes to be audible, the length of the root canal is measured with an impregnated length of the probe.

However, both of the above methods, one dependent on sound and the other on resistance or conductance, have not been found to be as accurate or as easy to use as desired.

OBJECTS AND SUMMARY OF THE INVENTION

It is an object of the invention to overcome inaccuracies in the prior measuring systems and to provide an accurate means of measuring the depth of root canals, as well as the depth of other bone cavities. Specifically, it is a purpose of the instant invention to provide a method for locating the anatomical apical foramina of human teeth by measuring tissue capacitance between the apical foramen and the oral mucosa in vivo.

The instant invention consists of a method for measuring capacitance in an electronic alternating-current impedance bridge, set to measure relative capacitance in microfarads when oscillating at a 10 kilohertz frequency, with a one volt potential difference between electrodes. An endodontic file may be used as a positive electrode, and a 2 centimeter diameter aluminum foil disk can serve as a negative electrode. Insulated lead wires connect the electrode to the impedance bridge.

The advantage of capacitance measurement over prior art devices is that when the probe reaches the apex, the capacitance as measured between the tooth and the oral mucosa about doubles. This is easily seen on a meter or the phenomena can be used to trigger an alarm or energize a light.

BRIEF DESCRIPTION OF THE DRAWINGS

The above and other features and objects of the invention will become apparent from the following detailed description in which reference is made to the accompanying drawing wherein a capacitance measuring circuit is illustrated connected to a pair of probes—one in the tooth and the other adjacent thereto.

DETAILED DESCRIPTION OF THE DRAWING

In conducting the experiment resulting in the instant invention, a Capacitance Measuring Assembly 1620–A of General Radio Company, Concord, Mass. was used. Set out below is a somewhat simplified schematic of the unit illustrating the principal portions thereof.

A Wien-bridge oscillator 1 such as type 1311–A by General Radio Company is seen having a bridge portion including a Wien-bridge circuit consisting of two parts: a frequency determining network including a pair of capacitors 3 and 5 and a pair of resistors 7 and 9. These provide positive feedback to sustain oscillation. The second part includes a resistive divider including a thermistor 11 and a resistance 13 to provide negative feedback for stabilizing the amplitude. The frequency is determined by any of 11 pairs of precision metal-film resistors in variable resistances 7 and 9 selected by a FREQUENCY SWITCH. With this circuit, frequency can be adjusted simply by changes in the resistances. The frequency vernier adjustment may be made by a variable resistance connected between capacitor 5 and ground (not shown).

The thermistor 11 automatically adjusts its resistance to the value needed to maintain oscillations. All of the above is well known as is most of the remainder to follow.

An input amplifier 15 is connected to the bridge and feeds into a high impedance driver and Class B emitterfollower amplifier 17. A feedback circuit 19 is seen connected to the output of amplifier 17 as is a variable resistance 21 which connects to a coupling transformer 23 which in turn is connected to a capacitance bridge 25 which may be a General Radio Company type 1650–A.

The Wien-bridge oscillator is set, as will be discussed below at 10KHz with a one volt potential difference between the electrodes discussed below.

In the measurement of capacitance, particularly those of high accuracy as is needed in the instant case, these measurements are made by a null method which uses some form of a basic ratio bridge. For high accuracy, resolution and stability in capacitance measurements, a bridge with inductively-coupled or transformer ratio arms has been found to be advantageous, and may be used in the instant case. The advantages of the transformer ratio arms in a bridge are that accuracies within a few parts per million are not difficult to obtain over a wide range of integral values. A simple capacitance bridge with a plurality of transformer ratio arms is seen at 27. On a toroidal core, a primary winding 29 is connected to the oscillator discussed above and serves only to excite the core; the number of primary turns determines the load on the oscillator but does not influence the bridge network. A pair of transformer secondary windings 31 and 33 are used as the ratio arms of the capacitance bridge with a standard capacitor 35 and an unknown capacitance between lines 37 and 39, as the other two arms in a conventional four-arm bridge network. In the instant case, capacitor 35 can be set at about 0.08 $\mu$f. Alternatively, capacitor 35 could obviously be variable from 0.03 $\mu$f to 0.15 $\mu$f.

The positive lead 37 is connected to an endodontic file 41. This file may be size 15. A negative electrode in the form of a 2 centimeter diameter foil disc 43 is connected to negative line 39 and serves as the negative electrode. Disc 43 is placed under a rubber dam on mucosa adjacent to a root of a tooth 45. The tooth has a canal 47 therein. The apical foramen is located at the base of the canal at 49.

The output of the bridge is connected to a Tuned Amplifier and Null Detector circuit 51 such as type 1232–A manufactured by General Radio Company via a conventional limiter circuit (not shown). The tuned amplifier and null detector 51 includes a three stage amplifier having a first stage 52. The output of the first stage amplifier is connected through a plurality of high and low pass filters 53 to a null network which includes an amplifier 55 with a tuning network 57 connected thereto. The network consists of three terminal RC circuits and gives a complete null without being balanced against a voltage divider, thus permitting frequency adjustment with a single potentiometer 59. The output of the tuned amplifier is connected to an amplifier-compressor 61 which in turn is connected to a rectified meter bridge circuit 63 including a pair of resistance arms 65 and 67 and a pair of diode arms 69 and 71. A null meter 73 with a capacitor 75 thereacross is connected between a pair of terminals 77 and 79.

As will be seen in the discussion below, with the Wien-bridge oscillator and the tuned amplifier and null detector set at 10KHz and one volt across electrodes 41 and 43 a null reading will appear at about 0.08 mf. When the capacitance increases above that point, there will be a large jump in the null meter 73.

CLINICAL TEST EXAMPLES

Clinical tests were conducted in two steps. In the first step, five patients undergoing root canal thereapy of nine teeth were tested. All the teeth were single rooted, with one having a periapical radiolucency and another having a mechanical perforation through the pulpal floor. Approximate root canal lengths were ascertained by accepted roentgenographic methods.

To determine capacitance readings, the negative electrode was placed under the rubber dam, on mucosa adjacent to the submerged tooth root. The positive electrode was gradually inserted, through an opening in the crown, into a canal that had previously been filled with saline solution. Capacitance readings were taken at five positions: −3, −2, and −1 mm short of the roentgenographically-determined apex; at the radiographic apex (0 mm); and 1 mm beyond the roentgenographically-determined apex. The mean for the group of teeth was calculated for each position.

The second step was carried out to evaluate the accuracy with which apical foramina could be located by using the mean capacitance ascertained from Step 1. The procedure was performed on two patients requiring extraction of a total of seven teeth. All teeth were without periapical radiolucencies and showed no clinical evidence of pulp disease. Crowns were isolated with a rubber dam, and partial pulp extirpation was completed under local infiltration anesthesia. The negative electrode was placed under the rubber dam on the oral mucosa, and the positive electrode (a size 15 file) was gradually inserted into the canal until a capacitance of 0.08 microfarads (mean value determined at roentgenographic apex in Step 1) registered on the impedance bridge. A reference point was etched on the crown; the file was marked at that point, removed, and measured with a millimeter rule.

To determine actual length, the tooth was extracted and a file was inserted to the anatomical apical foramen. The file was marked at the reference point, removed, and measured with the rule. This direct measurement of canal length was compared with the bioelectronically determined length.

Mean capacitance values measured at the roentgenographic apex and at various distances from that apex are shown in Table 1 below.

Table 1
Mean Capacitance at Various Distances from
Roentgenographic Apex of Root Canal

| Mean Capacitance (microfarads) | Distance from Apex (mm) | No. of Teeth |
| --- | --- | --- |
| .05 ± .03 | −3 | 5 |
| .05 ± .03 | −2 | 6 |
| .05 ± .03 | −1 | 7 |
| .08 ± .03 | 0 | 7 |
| .13 ± .04 | +1 | 6 |

A mean capacitance reading of 0.08 microfarads was determined at the roentgenographic apex. None of the other values differed significantly from that value. A significant doubling in impedance occurred, however, when the positive electrode moved from 1 mm short of the roentgenographic apex to 1 mm beyond the apex.

Readings from two teeth were excluded from the mean capacitance computations because their values were well beyond the range of values for the other teeth. An extremely low capacitance of 0.0059 microfarads was observed in testing the tooth with a periapical radiolucency, and a capacitance of 0.20 microfarads was observed in testing the mechanically perforated tooth.

A comparison of root canal lengths as determined by the bioelectronic and direct measurement methods is shown for seven teeth in Table 2.

Table 2

Root Canal Lengths as Determined by Bio-Electronic and Direct Measurement Methods in Two Patients

| Tooth number | Root canal lengths (mm) | | Errors (mm) |
|---|---|---|---|
| | Bio-electronic measurement | Direct measurement | |
| 1 | 20 | 20 | 0 |
| 2 | 21 | 22 | 1 |
| 3 | 20 | 20 | 0 |
| 4 | 23 | 23 | 0 |
| 5 | 24 | 24 | 0 |
| 6 | 25 | 25 | 0 |
| 7 | 23 | 23 | 0 |

Root canal lengths, as determined by the length of the inserted file when 0.08 microfarads registered on the impedance bridge, are given in the first column. The actual lengths of the seven root canals, as measured by direct means after extraction, are given in the second column. The difference, if any, between these two lengths is shown as the "Error." In six out of seven teeth, the measurements obtained by the two methods were the same. A difference of 1 mm is seen for one tooth.

CONCLUSIONARY FINDINGS

It will be noted that the mean capacitance of 0.08 microfarads between anatomical apical foramina and the oral mucosa obtained in Step 1 of the study was reproduced in six out of seven teeth in Step II. However, it will be appreciated that the 0.08 microfarads may not represent a constant capacitance in all cases. Perhaps a more meaningful finding was the significant increase in capacitance that resulted as the electrode passed from 1 mm short of the roentgenographic apex to 1 mm beyond that apex. This upward trend may serve as a more reliable guide than the application of 0.08 microfarads in indicating apical foramina, because 0.08 microfarads had a high standard deviation. In this study, the following factors may have been responsible for the deviations: (1) Tissue capacitance may have varied among patients; (2) Placement of the electrode tip relative to the anatomical foramina was approximated, owing to errors inherent in roentgenographic measurements; (3) Saline injections may not have completely filled the canals and this would reduce current conductivity. (4) - The imprecision of the millimeter rule for measuring files can introduce errors of ±0.05 mm. A more precise measuring device, such as a vernier caliper, would reduce such error.

In essence, the approximate doubling of the capacitance as the positive electrode passes from just within the canal to just beyond it provides needed accurate determination of canal length.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

I claim:
1. A method of measuring the depth of a root canal in a tooth comprising:
  a. forming an opening in the tooth crown,
  b. placing an electrode on mucosa adjacent the submerged tooth root,
  c. inserting a probe electrode through said opening into the root canal,
  d. connecting an oscillator to a capacitance bridge circuit and connecting said electrodes as one arm of said bridge circuit,
  e. measuring the capacitance across said electrodes,
  f. continuing of further insert said probe electrode,
  g. determining the point wherein the capacitance approximately doubles to locate the apical foramen,
  h. removing said probe electrode and measuring its depth of penetration at the point the capacitance approximately doubles.

2. A method as defined in claim 1 including connecting said bridge circuit to a tuned amplifier and null detector.

3. A method as defined in claim 1 including setting said oscillator at 10HKz and placing a potential difference of 1 volt across said electrodes.

4. The method of claim 1 including the step of inserting a saline solution into said root canal prior to insertion of said probe electrode.

5. A method as defined in claim 1 including placing a known capacitance of about 0.03–0.15 microfarads in one arm of said bridge circuit.

* * * * *